United States Patent
Parikh et al.

(10) Patent No.: US 7,801,561 B2
(45) Date of Patent: *Sep. 21, 2010

(54) METHODS OF CONFIGURING A GENERIC BLUETOOTH CONTROLLER OF A FLASH DRIVE TO BE COMPATIBLE WITH MULTIPLE BLUETOOTH PERIPHERAL DEVICES

(75) Inventors: Dhaval Parikh, Santa Clara, CA (US); Rajeev Nagabhirava, Santa Clara, CA (US)

(73) Assignee: SanDisk Corporation, Milpitas, CA (US)

( * ) Notice: Subject to any disclaimer, the term of this patent is extended or adjusted under 35 U.S.C. 154(b) by 781 days.

This patent is subject to a terminal disclaimer.

(21) Appl. No.: 11/536,095

(22) Filed: Sep. 28, 2006

(65) Prior Publication Data

US 2008/0081667 A1    Apr. 3, 2008

(51) Int. Cl.
*H04B 1/38* (2006.01)
(52) U.S. Cl. ..................... 455/557; 455/41.2
(58) Field of Classification Search ....... 455/41.2–41.3, 455/556.1–556.2, 557–558; 713/0.1
See application file for complete search history.

(56) References Cited

U.S. PATENT DOCUMENTS

| | | | |
|---|---|---|---|
| 5,701,476 A | 12/1997 | Fenger | |
| 6,600,726 B1 | 7/2003 | Nevo et al. | |
| 6,603,744 B2 | 8/2003 | Mizutani et al. | |
| 6,813,669 B1 | 11/2004 | Cato et al. | |
| 6,961,942 B1 * | 11/2005 | Adermann et al. | 719/328 |
| 6,986,030 B2 * | 1/2006 | Shmueli et al. | 713/1 |
| 7,082,461 B2 * | 7/2006 | Sharma et al. | 709/220 |
| 7,171,526 B2 * | 1/2007 | Cruz | 711/150 |
| 7,213,766 B2 | 5/2007 | Ryan et al. | |
| 7,233,808 B2 * | 6/2007 | Mooney et al. | 455/557 |
| 7,263,331 B2 * | 8/2007 | Gupta et al. | 455/41.2 |
| 7,293,117 B2 * | 11/2007 | Ohta | 710/10 |
| 7,428,605 B2 | 9/2008 | Ni et al. | |
| 2002/0012329 A1 | 1/2002 | Atkinson et al. | |
| 2002/0131388 A1 * | 9/2002 | Ami et al. | 370/338 |
| 2002/0159419 A1 | 10/2002 | Morris | |
| 2002/0167932 A1 | 11/2002 | McGowan | |
| 2003/0083013 A1 | 5/2003 | Mowery et al. | |
| 2005/0109841 A1 | 5/2005 | Ryan et al. | |
| 2005/0278461 A1 | 12/2005 | Ohta | |
| 2008/0081559 A1 | 4/2008 | Parikh et al. | |

OTHER PUBLICATIONS

Arfwedson, Henrik and Sneddon, Rob, "Ericsson's Bluetooth Modules", Nov. 4, 1999, Ericsson Review No. 4, pp. 198-205.*

(Continued)

*Primary Examiner*—Edward Urban
*Assistant Examiner*—Ganiyu Hanidu
(74) *Attorney, Agent, or Firm*—Jenkins, Wilson, Taylor & Hunt, P.A.

(57) ABSTRACT

A portable flash memory drive includes a Bluetooth controller with only a subset of the layers of a Bluetooth stack necessary for operation. This enables usage of a generic Bluetooth controller in the flash drive. Specific configuration for profiles and other aspects of Bluetooth communication are handled by upper layers of the Bluetooth stack that are stored in the flash memory of the drive and thereafter loaded into a host computer. The configuration and make up of the Bluetooth stack can therefore be easily updated and changed when desired.

12 Claims, 6 Drawing Sheets

OTHER PUBLICATIONS

Notification of Transmittal of the International Search Report and the Written Opinion of the International Searching Authority, or the Declaration for International Application No. PCT/US07/078838 (Apr. 16, 2008).

"HCI USB Transport Layer," Bluetooth Specification, Version 1.0 B, pp. 759-773 (Nov. 29, 1999).

"Host Controller Interface Functional Specification," Bluetooth Specification, Version 1.0 B, pp. 517-539 (Nov. 29, 1999).

"Device Drivers via the Access Bus," IBM Technical Disclosure Bulletin, vol. 39, No. 1, p. 135 (Jan. 1996).

MattM, "Seecode AIR Mate Bluetooth USB Dongle with Flash Storage Memory," www.mtekk.com.au/Articles/tabid/54/articleType/ArticleView/articleID/267/Default, published Mar. 15, 2004, pp. 1-7.

Specification of the Bluetooth System, Covered Core Package, Version: 1.2, vol. 0-3, Nov. 5, 2003.

Notice of Allowance and Fee(s) Due for U.S. Appl. No. 11/536,155 (Apr. 2, 2010).

Notice of Allowance and Fee(s) Due for U.S. Appl. No. 11/536,155 (Jan. 19, 2010).

"U3 Platform 1.0 SDK Application Deployment Guide," Document No. 04-UM-0405-00, Version 1.0, Revision 4.0, p. 1-60 (Sep. 2005).

"PBM 990 90 Bluetooth™ Baseband Controller," Ericsson Microelectronics, p. 1-16 (Copyright Dec. 2001).

"Bluetooth™ Radio PBA 313 01/2 (Bluetooth 1.0b), PBA 313 01/3 (Bluetooth 1.1)," Ericsson Microelectronics, p. 1-12 (Copyright Oct. 2001).

"ROK 101 008 Bluetooth Module," Ericsson Microelectronics, p. 1-18 (Copyright Sep. 2001).

Non-Final Official Action for U.S. Appl. No. 11/536,155 (Jul. 29, 2009).

* cited by examiner

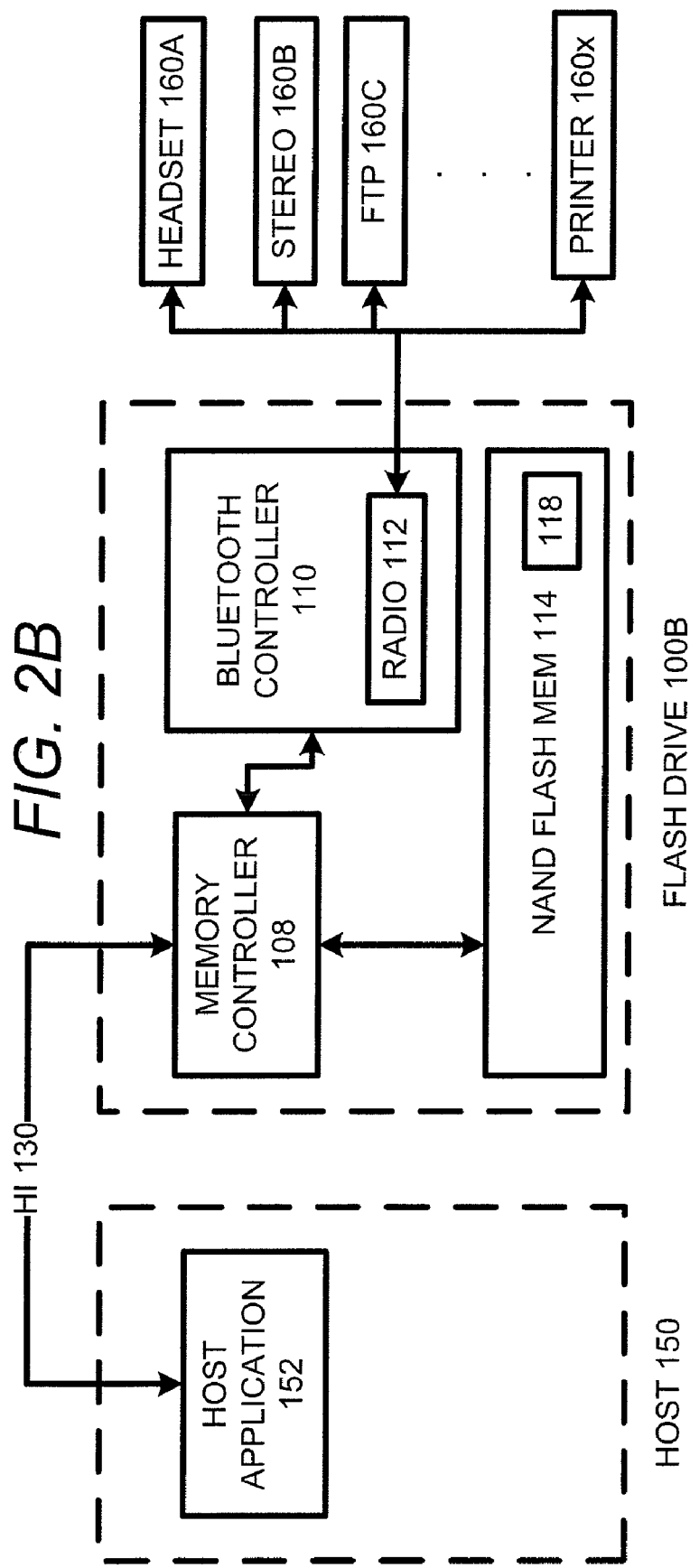

METHODS OF CONFIGURING A GENERIC BLUETOOTH CONTROLLER OF A FLASH DRIVE TO BE COMPATIBLE WITH MULTIPLE BLUETOOTH PERIPHERAL DEVICES

CROSS REFERENCE TO RELATED APPLICATIONS

The present application is related to application Ser. No. 11/536,155 entitled "Flash Drive That Configures Generic Bluetooth Controller of the Drive to be Compatible With Multiple Bluetooth Peripheral Devices" filed concurrently herewith.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

FIELD OF THE INVENTION

The present invention relates generally to portable flash memory mass storage devices and Bluetooth radio communications, and more specifically to providing and configuring Bluetooth communications with a portable flash memory drive including integrated with Bluetooth functionality.

BACKGROUND

Many different types of Bluetooth enabled peripheral devices are available on the market. Getting them to communicate with a host device such as a personal computer or personal digital assistant or the like is not always an easy task.

If a personal computer does not have built in Bluetooth capability, one way to add the capability is through a plug in type adapter. These adapters are commonly referred to as dongles.

A Bluetooth dongle will only operate after the proper drivers are installed. The drivers of the dongle are typically installed from a CD ROM provided with the dongle, or by downloading the proper driver from the manufacturer. This is an inconvenient and often times fruitless process.

In addition to being inconvenient, time consuming, and often fruitless, the manual driver loading is often impossible. Often the drivers must modify the registry of the host computing device, and in operating systems such as Microsoft Windows™, administrative privileges are required to do so. Corporate computers provided to employees rarely give the user administrative privileges. Thus, in many computers, adding Bluetooth communications with a standard driver/dongle combination is simply not possible.

In addition, even after the proper drivers are installed, different host applications need to be configured to communicate with different classes of Bluetooth devices once Bluetooth capability is provided.

SUMMARY OF THE INVENTION

A portable flash memory drive about the size of keychain is provided. The drive not only acts as a mass storage drive, it provides Bluetooth communications to host devices that it is plugged into. The most common embodiment plugs into a USB port of a drive.

When plugged into a universal serial bus ("USB") port, a launch pad with a Bluetooth manager program will appear. The user then runs the program when Bluetooth communication is desired and the drive is automatically configured to run with different classes of Bluetooth peripheral devices. This is the case even for users that do not have administrative privileges and would not otherwise be permitted to add the necessary drivers to enable a standard Bluetooth dongle.

The Bluetooth manager stored on the USB flash drive associates different classes of devices with the appropriate software applications, and therefore communication between the applications of the host device and appropriate peripheral devices can be established. For example, Bluetooth ("BT") enabled headphones can be associated with a media player, or a BT headset can be associated with a voice over IP ("VOIP") application such as Skype™.

Because the manager is located on the flash drive, the Windows™ registry does not need to be modified. Temporary environment variables are stored on the drive rather than in the Windows™ registry.

Furthermore, because the flash memory of the drive is utilized to store profile information for various different classes of BT peripheral devices, a "generic" Bluetooth controller ASIC can be integrated into the flash drive. The device specific information need not be in the ASIC. Nor will an expensive ASIC incorporating a DSP be required in order to transmit audio/video files or for the host to properly associate a peripheral with a multimedia application and transmit the information to appropriate audio/video class peripheral.

BRIEF DESCRIPTION OF THE FIGURES

FIG. 2B illustrates a system with host 150 communicating by Bluetooth to peripheral devices through flash drive 100B.

DESCRIPTION

Figure 1:
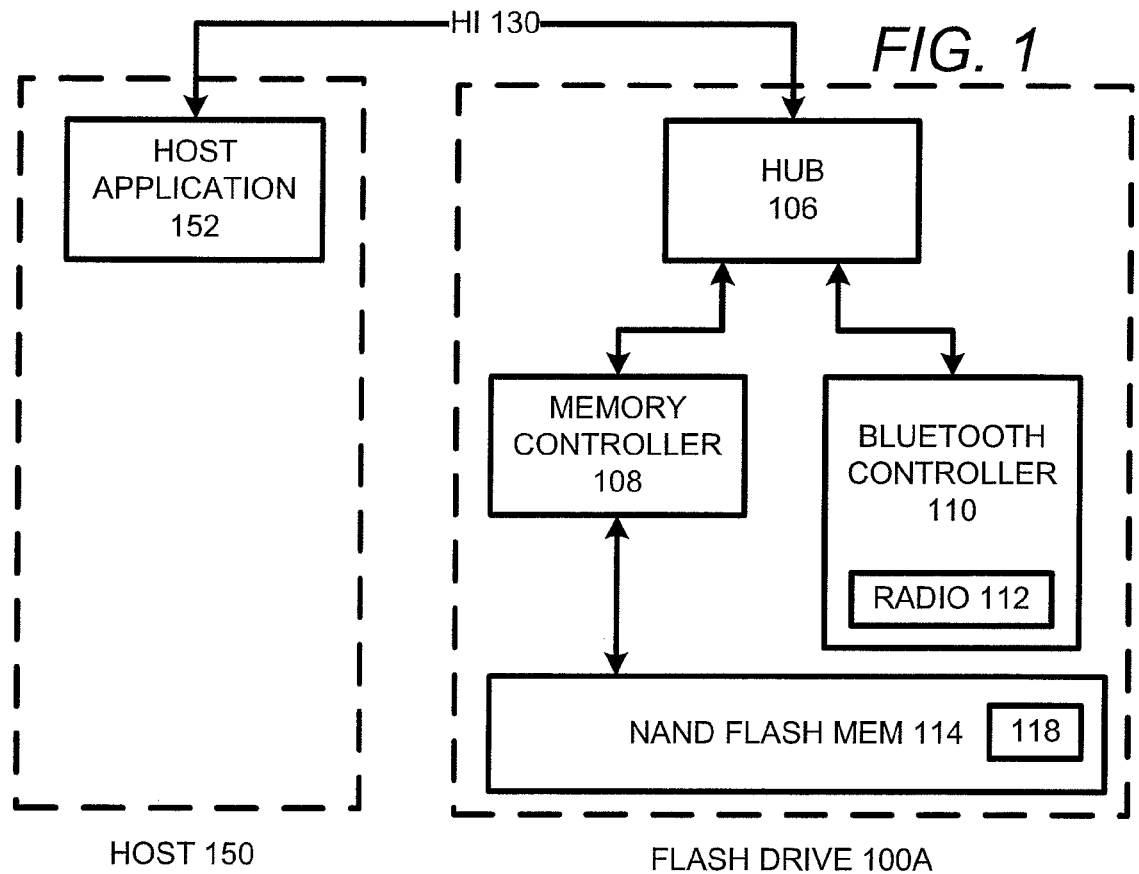
FIG. 1 is a block diagram of flash drive 100A, an embodiment of the present invention.

Bluetooth is an industrial specification for wireless personal area networks (PANs), also known as IEEE 802.15.1. Bluetooth provides a way to connect and exchange information between devices like personal digital assistants (PDAs), mobile phones, laptops, PCs, printers, digital cameras and video game consoles via a secure, globally unlicensed short range radio frequency.

Many computing devices are not capable of Bluetooth transmission because the hardware is not built in. Therefore the present invention provides plug-in Bluetooth functionality to those devices, in combination with the convenience and added storage of a pocket sized flash memory drive that is used to transport files. The most common embodiment is referred to as a universal USB flash drive because it plugs into a USB port. Connectors other than a USB connector (and the associated communication protocols) may be utilized in different embodiments to plug into and communicate with a host device, even if the device is referred to as a USB flash drive.

In order to use Bluetooth wireless technology, a device must be able to interpret certain Bluetooth profiles. The profiles define the possible applications that work with the device. Bluetooth profiles are general behaviors through which Bluetooth enabled devices communicate with other devices. Bluetooth technology defines a wide range of profiles that describe many different types of use cases. At a minimum, each profile specification contains information on the following topics: dependencies on other profiles; suggested user interface formats; and specific parts of the Bluetooth protocol stack used by the profile. To perform its task, each profile uses particular options and parameters at each layer of the stack.

The configuration information regarding a profile is in the upper layers of a Bluetooth stack, typically an application layer. The proper profile for a device must be used to establish communication with the device. For example, a device with a profile for a headset will not work with a printer and vice versa. Often times, the devices are also manufacturer and product specific. The various available profiles will change over time and new profiles will likely be developed. For more information on the details of Bluetooth implementation, please refer to the *Specification of the Bluetooth System, Covered Core Package version:* 1.2, Vol. 0-3, dated 5 Nov. 2003, by the Bluetooth Special Interest Group ("SIG"), which, like all documents referred to in this application, is incorporated by reference in the entirety.

The following profiles are typically needed for general operation. Generic access profile ("GAP") is mandatory for proper BT implementation and is used to manage connections between different Bluetooth devices. GAP exposes a high level API that can be used by the application program to configure the stack and manage connections to different Bluetooth products. Services discovery application profile ("SDAP") is also mandatory for proper BT implementation and is used to query other BT products for supported services and functionality. SDAP exposes a high level API that can be used by the application program to query other BT products for supported functionality. Serial port profile ("SPP") provides emulated virtual serial ports over a BT radio link. SPP exposes a high level API that can be used by the application program to transmit and receive data in a way that is very similar to a standard serial port.

Beyond those profiles typically needed for general operation, over 20 device class profiles currently exist. A few of the common profiles are described below for exemplary purposes. The present application should in no way to be limited to the profiles described herein.

Advanced Audio Distribution Profile (A2DP)

This is designed to transfer a 2-channel stereo audio stream, like music from an MP3 player, to a headset or car radio. It includes mandatory support for low complexity Sub_Band_Codec (SBC) and supports optionally: MPEG-1, 2 Audio, MPEG-2, 4 AAC and ATRAC, and is extensible to support manufacturer defined codecs.

Basic Printing Profile (BPP)

This allows devices to send text, e-mails, vCards, or other items to printers based on print jobs. It differs from HCRP in that it needs no printer-specific drivers. This makes it more suitable for embedded devices such as mobile phones and digital cameras which cannot easily be updated with drivers dependent upon printer vendors.

Dial-Up Networking Profile (DUN)

This profile provides a standard to access the Internet and other dial-up services over Bluetooth. The most common scenario is accessing the Internet from a laptop by dialing up on a mobile phone, wirelessly.

File Transfer Profile (FTP)

Provides access to the file system on another device. This includes support for getting folder listings, changing to different folders, getting files, putting files and deleting files.

Human Interface Device Profile (HID)

Provides support for devices such as mice, joysticks, keyboards, etc. It is designed to provide a low latency link, with low power requirements.

Headset Profile (HSP)

This is the most commonly used profile, providing support for the popular Bluetooth Headsets to be used with mobile phones. It relies on SCO for audio and a subset of AT commands from GSM 07.07 for minimal controls including the ability to ring, answer a call, hang up and adjust the volume.

Video Distribution Profile (VDP)

This profile allows the transport of a video stream. It could be used for streaming a recorded video from a PC media center to a portable player, or from a digital video camera to a TV. Support for H.263 baseline is mandatory. Support for MPEG-4 Visual Simple Profile, H.263 profiles 3 and 8 are optionally supported, and covered in the specification.

FIG. 1 illustrates flash drive 100A communicating with host application 152 of host 150 over host interface ("HI") 130. Host interface 130 may be a USB interface, a wireless USB ("WUSB") interface, a serial ATA ("SATA") interface, a PCI express ("PCIe") interface, a "firewire" or IEEE 1394 interface, or any other equivalent. Host 150 may be any computing device with an appropriate connector/receptacle. Memory controller 108 controls the read/write operations of data to and from flash memory 114, which is preferably the NAND variety. The memory controller 108 also controls communications to and from host 150, through hub 106. Memory controller 108 is such that files stored in flash memory 114 are accessed by host 150 as if the drive were a hard disk drive. Bluetooth controller 110 is an application specific integrated circuit ("ASIC") and includes radio 112. Radio 112 is the hardware responsible for transmitting and receiving the radio signal, and includes or may be referred to as a transceiver. Hub 106 manages data transmission to/from memory controller 108, Bluetooth controller 112 and host interface 130. In the preferred embodiments, the hub is a USB type hub and host interface 130 is a USB interface. Within NAND flash memory 114 are the upper layers 118 of a Bluetooth stack necessary for operation of Bluetooth controller 110 with host 150 and host application 152.

Figure 2A:
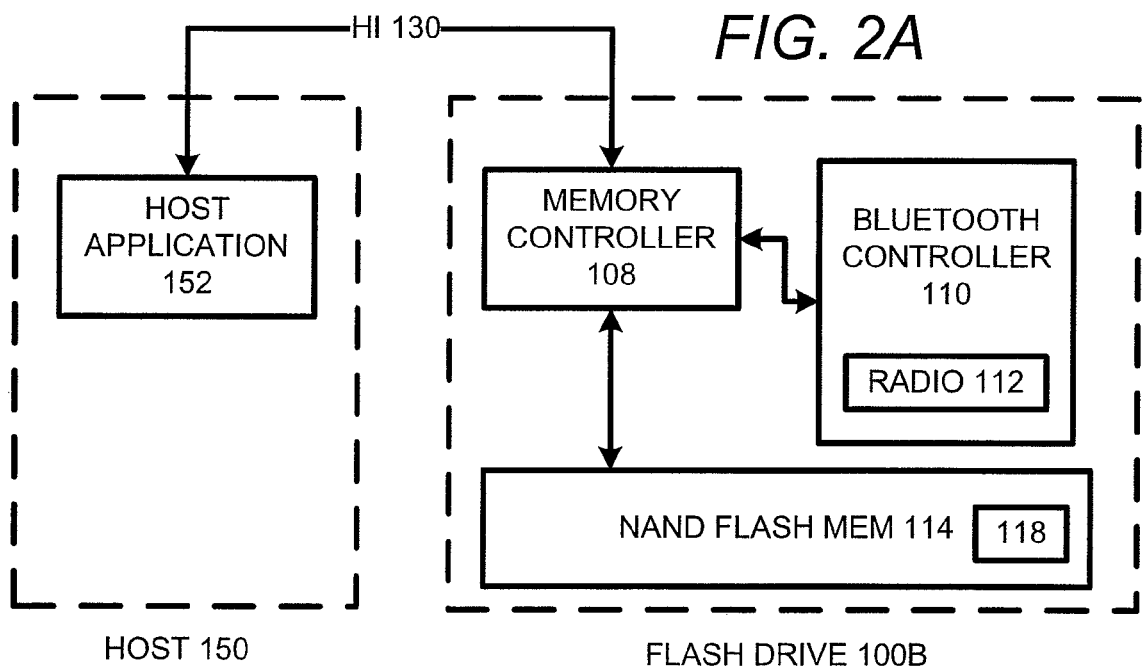
FIG. 2A is a block diagram of flash drive 100B, another embodiment of the present invention.

Flash drive 100B of FIGS. 2A and 2B is the similar to flash drive 100A with the exception that hub 106 is not present, as the functionality of the hub is integrated into memory controller 108. In FD 100A the link between Bluetooth controller 110 and hub 106 is preferably a USB link, whereas in FD 100B the link between Bluetooth controller 110 and memory controller 108 is preferably a Universal Asynchronous Receiver/Transmitter ("UART") connection. Flash drive 100A and 100B, the functionality of which are essentially the same, may hereinafter simply be referred to as flash drive ("FD") 100.

FIG. 2B illustrates a system with host 150 communicating by Bluetooth to peripheral devices 160A-160x through flash drive 100B. Each of these devices may have a different profile and each different type of profile requires its own Bluetooth stack to run and to be properly associated with different host applications, such as host application 152. The component layers and respective functionality of the Bluetooth stack will be described with regard to FIG. 3.

Figure 3:
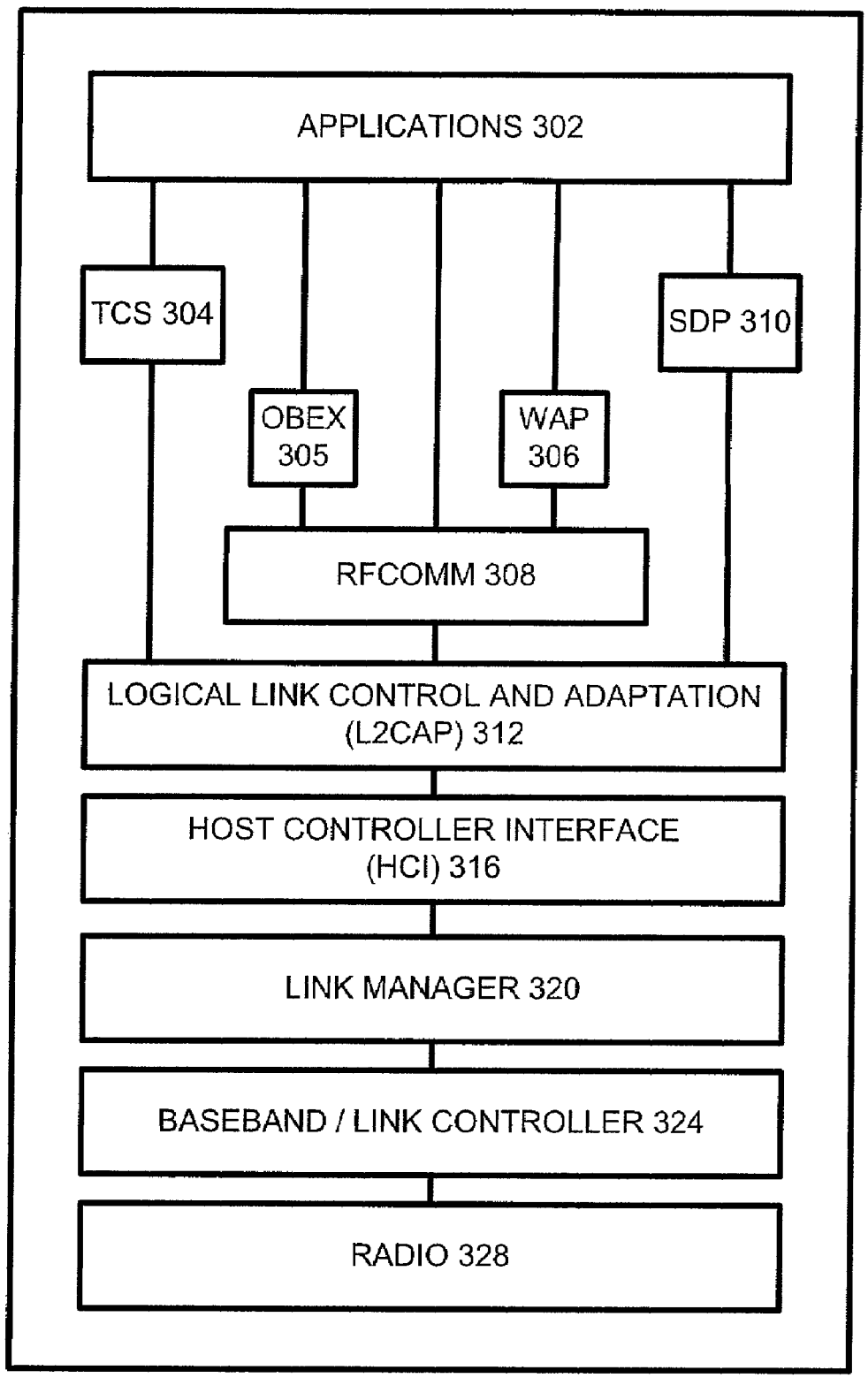
FIG. 3 is a block diagram illustrating the layers of Bluetooth protocol stack 300.

FIG. 3 illustrates the layers of Bluetooth protocol stack 300. Applications that interact with the stack use the stack functionality by calling different API functions. The stack takes care of all the complex communication rules that are defined in the Bluetooth specification, which is incorporated by reference in the entirety, and manages communication with the Bluetooth module.

Applications layer 302 primarily relates to profile configuration and interaction with external software applications.

Telephony control specification ("TCS") layer 304 provides call control and signaling of voice channels. Wireless application protocol ("WAP") layer 306 handles control and signaling for WAP transmission. Object exchange ("OBEX") layer 305 handles responses coming from the lower layers beneath it and distinguishes between the multiple responses.

Radio frequency communications ("RFCOMM") layer 308 implements functionality needed for a virtual RS232 link, including modem control signals. Most of the application profiles use RFCOMM to send and receive data. Service Discovery Protocol ("SDP") layer 310 provides functionality to publish supported Bluetooth functionality (SDP server) as well as to query other Bluetooth products for Bluetooth functionality (SDP client).

Logical Link Control and Adaptation Protocol ("LSCAP") layer 312 allows multiple communication channels to share a single Bluetooth link (multiplexing). L2CAP layer 312 also handles segmentation and assembly of long messages.

Host controller interface ("HCI") layer 316 provides a standardized communications protocol between the stack and the controller. HCI communications packets can be transmitted over UART, RS232, USB, or PC card interfaces.

Link manager layer 320 is responsible for the creation, modification, and release of logical links (and, if required, their associated logical transports), as well as the update of parameters related to physical links between devices. The link manager achieves this by communicating with the link manager in remote Bluetooth devices using the link management protocol.

Baseband/Link Controller layer 324 is responsible for all access to the radio medium, and for the encoding and decoding of Bluetooth packets from the data payload and parameters related to the physical channel, logical transport and logical link.

Radio layer 328 is responsible for transmitting and receiving packets of information on the physical channel.

The Bluetooth core layers are provided as part of Bluetooth controller 110. HCI layer 316, link manager layer 320, baseband/link controller layer 324, and radio layer 328 are part of the core. The upper layers 118, stored in flash memory 114, comprise at least applications layer 302. SDP layer 310, RFCOMM layer 308, and L2CAP layer 312 may be either part of the core, or alternatively part of the upper layers 118 stored in flash.

Figure 4:
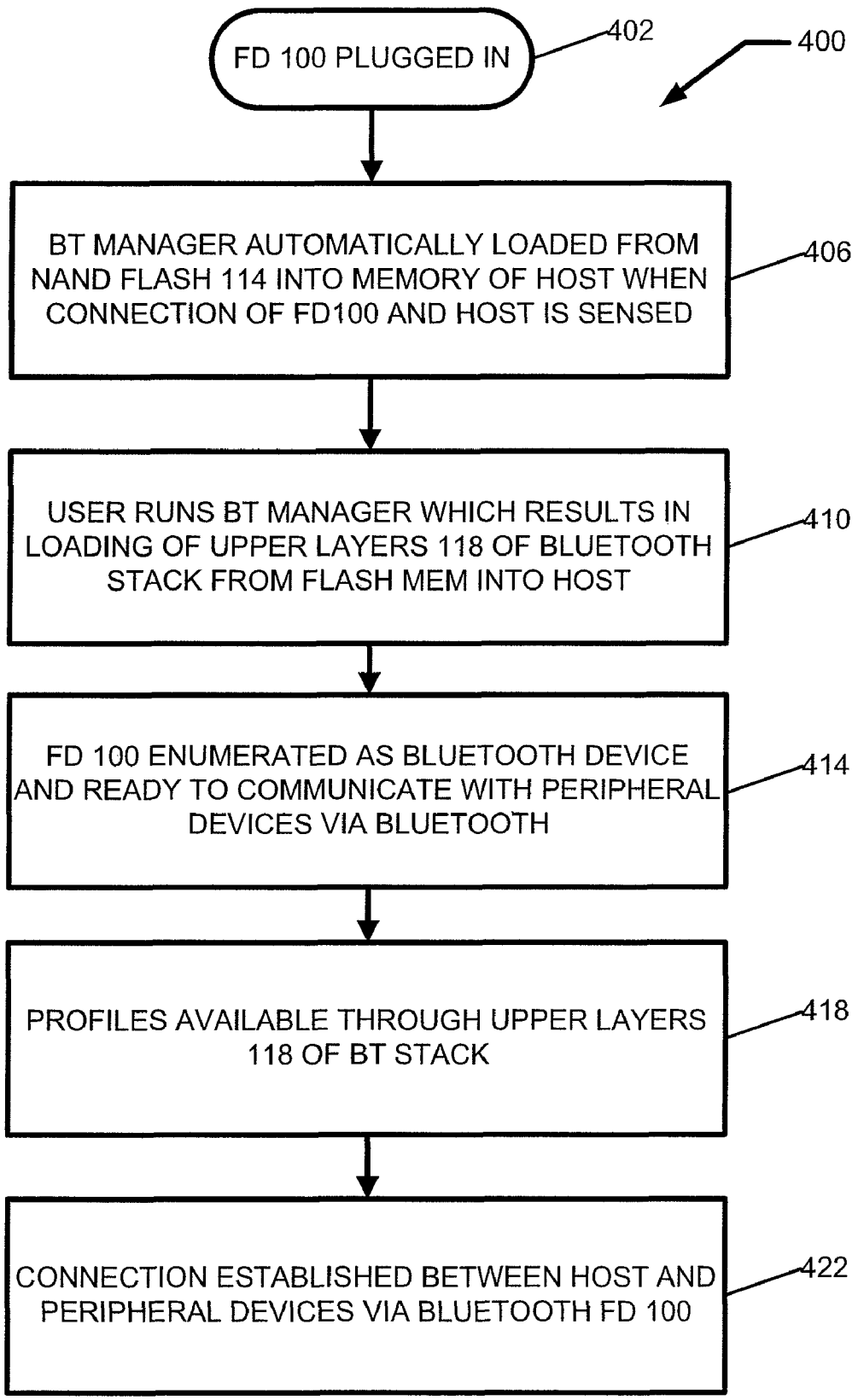
FIG. 4 is a flowchart of auto configuration method 400, according to an embodiment of the present invention.

FIG. 4 is a flowchart of method 400 for configuring a "generic" or core only Bluetooth controller, according to an embodiment of the present invention. In step 402, FD 100 is plugged into the host. The host and FD 100 will detect the connection of the two devices. A program that enables Bluetooth operation of FD 100 will then be made available in step 406. In step 410, if a user has need of BT communication, he runs the BT manager which results in the loading of upper layers 118 of the Bluetooth stack from flash memory 114 into the host. FD 100 is then enumerated as a Bluetooth device and is ready to communicate with peripheral devices via Bluetooth, as seen in step 414. The profiles needed to communicate with various types of devices are now available through the upper layers 118 of the stack, as seen in step 418. Connection can then be established, as seen in step 422, between host 150, including applications 152, and peripheral Bluetooth devices 160 via Bluetooth controller 110 of FD 100.

Upper layers 118 may be stored anywhere in flash memory 114, for example in a freely available user area or in a hidden system partition. In either case, because the upper layers are stored in flash memory, they can easily be updated or changed to accommodate different profiles and different devices. Furthermore, multiple versions of upper layers 118 (different files) may be stored, and in certain embodiments a user can select which version should be installed. In some embodiments, different users of FD 100 may have different user profiles stored in the device, and a particular user profile may be associated with a particular version. Therefore, a particular user profile may be associated with different Bluetooth device profiles. The Bluetooth manager will also allow a user to assign or reassign associate software applications in the host with particular classes of Bluetooth devices, and with any Bluetooth devices that are enumerated by the host and available to the Bluetooth manager.

Figure 5:
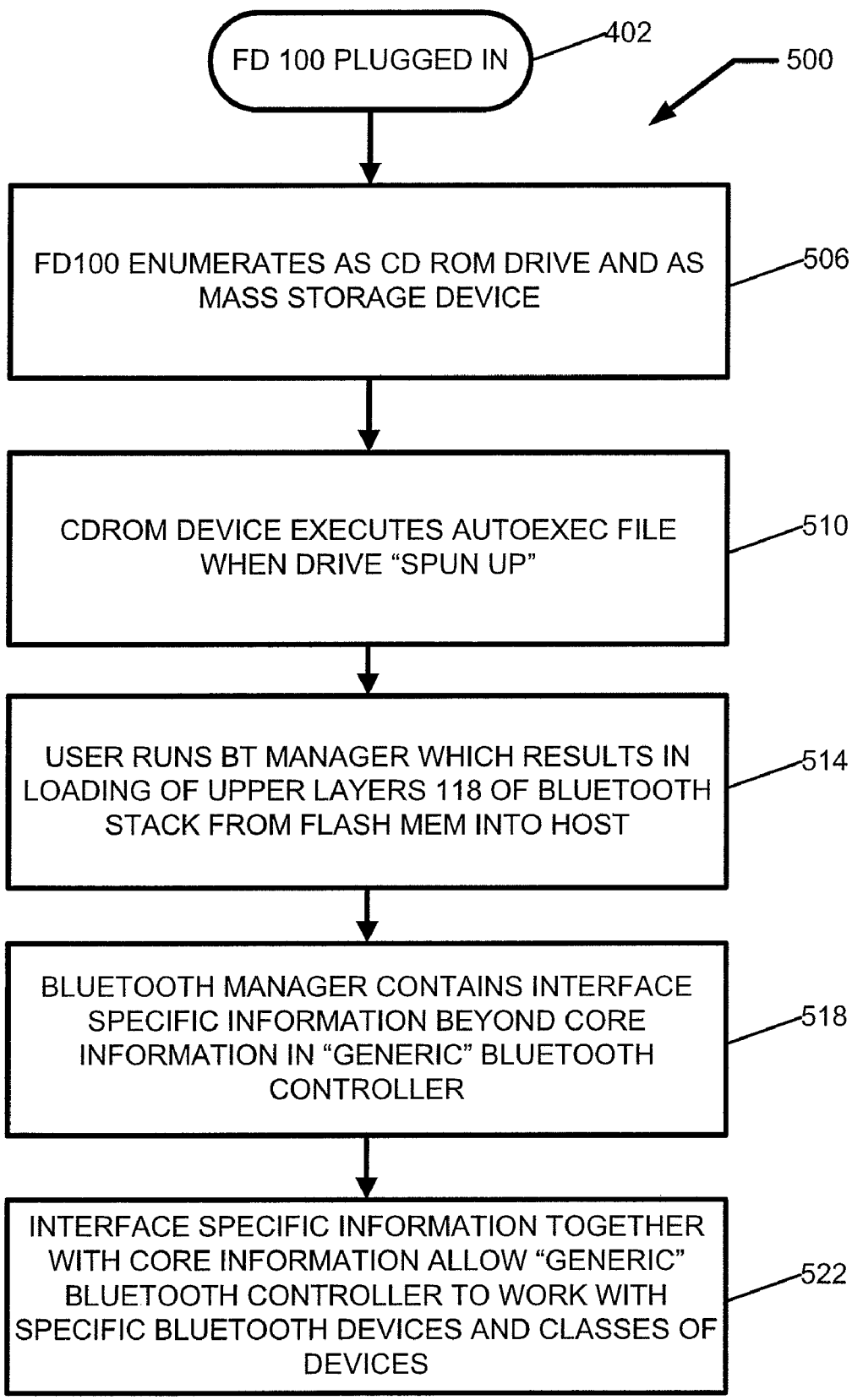
FIG. 5 is a flowchart of auto configuration method 500, according to an embodiment of the present invention.

FIG. 5 is a flowchart of auto configuration method 500, according to an embodiment of the present invention. In this method a Bluetooth controller having only the core layers can be configured to work with different types of devices. Thus, a specific type of Bluetooth controller need not be used, and a very flexible system that can be configured "on the fly" is achieved.

As described in FIG. 4, FD100 is plugged in, in step 402. An embodiment of the invention utilizing a U3 compliant flash drive and/or host will now be described.

U3 provides a platform where programs are stored and run from FD100. On a U3 device, environment variables for the device are not stored in the host operating system registry, but instead are stored in flash memory of the U3 device, which is FD100 in this case. Any accommodations in the host to run the programs and operate the Bluetooth functionality of FD100 are temporarily made during the time FD100 is plugged in.

In step 506, FD100 enumerates as both a CDROM drive and separately as a mass storage device. The CDROM drive has its own partition in FD 100. In step 510, a file in the CDROM drive is automatically executed by the host. In other words, when host "spins up" the CDROM drive to read its contents, an autoexec file in the CDROM partition of the flash memory is executed by the host. The autoexec file then causes a Bluetooth manager program in FD100 to be made available to for launching. The user then runs the BT manager which results in loading of the upper layers 118 of the Bluetooth stack from flash memory 114 into (an executable memory of) host 150 in step 514. The Bluetooth manager program contains interface specific information beyond the core information in a "generic" or core only Bluetooth controller, as seen in step 518. The interface specific information, together with the core information, allow the generic controller to work with specific Bluetooth devices and classes of the devices, as indicated in step 522. This allows for maximum flexibility in Bluetooth configuration, as well as a cost effective solution based upon a cost effective basic Bluetooth controller.

A flash memory drive according to the present invention therefore provides not only Bluetooth communications to different classes of Bluetooth peripherals, but can easily accommodate new classes over time through upper layers 118. Furthermore, the flash drive of the present invention contains its own drivers needed for usage with a host, and those drivers can be loaded without the hassle of having to find a CDROM drive, with or without host administrative privileges.

While usage of a U3 platform for running programs from a plug in drive has been described with regard to FIG. 5, other mechanism or methods with the same effect may also be used with the present invention.

Figure 6:
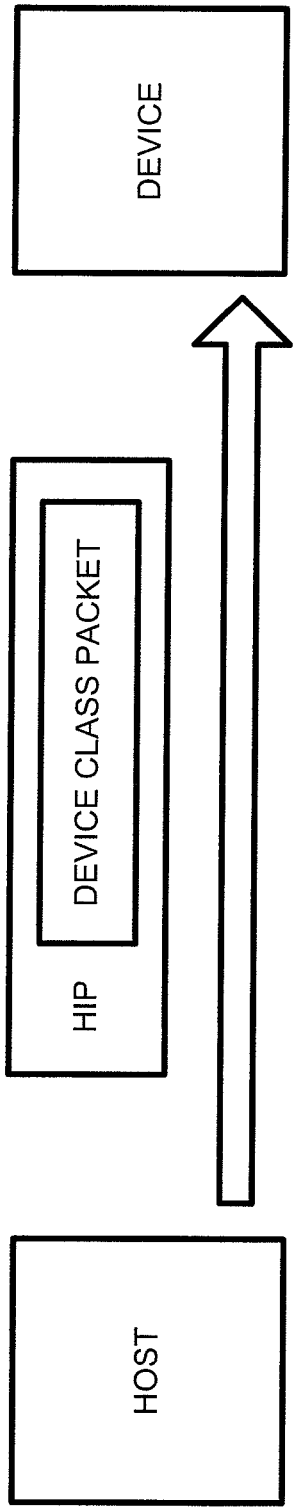
FIG. 6 is an exemplary illustration of a device class packet as the payload of a host interface packet.

One alternative to providing all layers of the Bluetooth stack in the host, when dealing with multimedia content and applications, is to integrate a multimedia digital signal processor chip ("DSP") into a Bluetooth controller ASIC. In such a case, the BT controller incorporating the multimedia DSP will recognize and decode the audio data with codecs provided within the DSP. In this case, the payload of the host interface packets transmitted over will be audio/video packets that are yet to be decoded. While this is the case in the example of multimedia content, in general, it is also similar for other scenarios and types of peripheral devices. In these cases, the content of the HI packets will be device class packets that format of which differs depending on the class of the peripheral device. This can be seen in FIG. 6.

Figure 7:
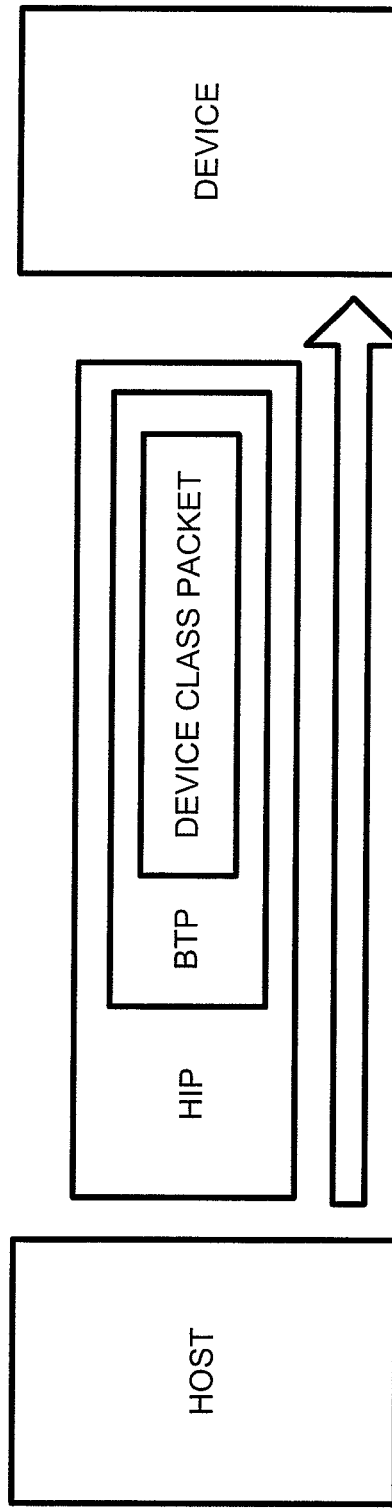
FIG. 7 is an exemplary illustration of a Bluetooth packet as payload of the host interface packet, as communicated with flash drive 100A or 100B.

In the present invention, the need for the DSP in the BT controller is eliminated because with the provision of the appropriate upper layers 118 of the stack from flash memory, the host processor can be used to decode the multimedia content and pass it through a generic controller in FD 100 to the stereo class peripheral. This saves several dollars from the cost of each Bluetooth controller, and the overall flash drive 100. Additionally, as seen in FIG. 7, the payload of the transmitted host interface packets will be Bluetooth packets (that carry the device specific packets) and therefore, in order to decode the packets, all that is needed is a standardized Bluetooth controller in the peripheral, rather than a controller that needs to decode device class packets.

While embodiments of the invention have been described, it should be understood that the present invention is not limited to these illustrative embodiments but is defined by the appended claims.

It is claimed:

1. A method of providing Bluetooth communications to a host computing device, the method comprising:
   providing a portable flash drive comprising a flash memory array operable to store user data files and a Bluetooth controller located in the portable flash drive and having core layers of a Bluetooth stack;
   storing, in the flash memory array of the flash drive, one or more upper layers of the Bluetooth stack; and
   causing, upon connection of the flash drive to a host computing device, a program to be automatically transferred from the flash memory array to an executable memory of the host computing device, and thereafter executed by the host computing device,
   said program causing the upper layers of the Bluetooth stack to be loaded into the executable memory of the host computing device, thereby forming the complete Bluetooth stack usable by the host computing device to communicate with other Bluetooth peripheral devices via the portable flash drive, wherein the flash memory array is accessible by the host computing device when the portable flash drive is connected to the host.

2. The method of claim 1, further comprising configuring the host computing device to communicate with a particular class of Bluetooth peripheral device.

3. The method of claim 1, wherein said program further causes the upper layers of the Bluetooth stack to be executed from the executable memory of the host computing device.

4. The method of claim 1, wherein the core layers of the Bluetooth stack comprise a radio layer, a baseband layer, a link manager layer, and a host controller interface layer.

5. The method of claim 1, wherein the one or more upper layers of the Bluetooth stack comprise an application layer.

6. The method of claim 5, wherein the one or more upper layers of the Bluetooth stack further comprise one or more of an L2CAP layer, an RFCOMM layer, and an SDP layer.

7. A method of enabling Bluetooth communications between a host and a peripheral device, the method comprising:
   in a portable flash memory drive comprising a flash memory operable to store user data files, providing a Bluetooth controller located in the portable flash memory drive and operable to control Bluetooth radio frequency communications;
   providing interface specific Bluetooth device drivers in the flash memory of the flash memory drive rather than in the Bluetooth controller; and
   causing, upon connection of the flash drive to a host, the interface specific Bluetooth drivers to be automatically loaded into a memory of the host and executed by the host, thereby configuring an operating system environment of the host to recognize a class of the peripheral device and enabling the host to communicate with other Bluetooth peripheral devices via the Bluetooth controller within the portable flash memory drive, wherein the flash memory of the flash memory drive is accessible by the host when the flash memory drive is connected to the host.

8. The method of claim 7, further comprising configuring the host and/or the flash drive to communicate to the recognized class.

9. A method of providing Bluetooth communications to a host computing device, the method comprising:
   providing a portable flash drive configured to be recognized by a host computing device as both a CD ROM drive and a mass storage device operable to store user data files;
   providing a Bluetooth radio and control circuitry within the portable flash drive; and
   upon connection of the portable flash drive to the host computing device, causing the host computing device to automatically execute a program from what the host computing device recognizes as the CD ROM drive, the program when executed causing the host computing device to retrieve Bluetooth configuration information, usable by the host computing device to communicate with other Bluetooth peripheral devices via the Bluetooth radio and control circuitry of the portable flash drive, from what the host computing device recognizes as the mass storage device and to load the Bluetooth configuration information into a memory of the host computing device, wherein what the host computing device recognizes as the mass storage device is accessible by the host computing device when the portable flash drive is connected to the host computing device.

10. The method of claim 9, wherein the Bluetooth configuration information comprises information relating to the class of a Bluetooth peripheral device.

11. The method of claim 10, further comprising linking a host application with the class of the Bluetooth peripheral device.

12. The method of claim 9, further comprising communicating from the host computing device to a peripheral device through the Bluetooth radio and control circuitry of the portable flash drive.

* * * * *